United States Patent
Dalsgaard et al.

(10) Patent No.: US 11,973,560 B2
(45) Date of Patent: Apr. 30, 2024

(54) PRIORITIZING BEAM RECOVERY MEASUREMENTS OVER OTHER MEASUREMENTS

(71) Applicant: NOKIA TECHNOLOGIES OY, Espoo (FI)

(72) Inventors: Lars Dalsgaard, Oulu (FI); Riikka Karoliina Dimnik, Helsinki (FI)

(73) Assignee: Nokia Technologies Oy, Espoo (FI)

(*) Notice: Subject to any disclaimer, the term of this patent is extended or adjusted under 35 U.S.C. 154(b) by 399 days.

(21) Appl. No.: 17/282,609

(22) PCT Filed: Oct. 3, 2019

(86) PCT No.: PCT/EP2019/076802
§ 371 (c)(1),
(2) Date: Apr. 2, 2021

(87) PCT Pub. No.: WO2020/070238
PCT Pub. Date: Apr. 9, 2020

(65) Prior Publication Data
US 2021/0344402 A1 Nov. 4, 2021

Related U.S. Application Data

(60) Provisional application No. 62/741,991, filed on Oct. 5, 2018.

(51) Int. Cl.
*H04B 7/06* (2006.01)
*H04W 24/10* (2009.01)
(Continued)

(52) U.S. Cl.
CPC .......... *H04B 7/0695* (2013.01); *H04W 24/10* (2013.01); *H04W 56/001* (2013.01); *H04W 76/19* (2018.02)

(58) Field of Classification Search
None
See application file for complete search history.

(56) References Cited

U.S. PATENT DOCUMENTS

| 2018/0206170 A1 | 7/2018 | Nagaraja et al. |
| 2019/0053071 A1* | 2/2019 | Ly .................. H04L 5/0025 |

(Continued)

FOREIGN PATENT DOCUMENTS

| JP | 2019-220649 A | 12/2019 |
| JP | 20200518944 A1 | 6/2020 |

(Continued)

OTHER PUBLICATIONS

3GPP TS 38.133 V15.2.0 (Jun. 2018), 3rd Generation Partnership Project; Technical Specification Group Radio Access Network; NR; Requirements for support of radio resource management (Release 15), 79 pages.

(Continued)

*Primary Examiner* — Anh Ngoc M Nguyen
(74) *Attorney, Agent, or Firm* — Barta Jones, PLLC

(57) ABSTRACT

According to a first embodiment, a method may include determining, by the user equipment, that a number of beam failure instances is greater than or equal to at least one threshold. The method may further include initiating, by the user equipment, at least one measurement on at least one beam candidate set. The method may further include suspending, by the user equipment, non-beam candidate measurements performed by the user equipment.

20 Claims, 2 Drawing Sheets

(51) Int. Cl.
  *H04W 56/00* (2009.01)
  *H04W 76/19* (2018.01)

(56) References Cited

U.S. PATENT DOCUMENTS

2019/0297648 A1* 9/2019 Nagaraja ............... H04B 7/063
2020/0280417 A1* 9/2020 Lindoff ............... H04B 7/0695
2021/0111783 A1* 4/2021 Zhang .................. H04W 76/27
2021/0120530 A1* 4/2021 Xia ....................... H04L 5/0053

FOREIGN PATENT DOCUMENTS

WO    2018/129300 A1    7/2018
WO    20190220649 A1    11/2019

OTHER PUBLICATIONS

3GPP TS 38.213 V15.3.0 (Sep. 2018), 3rd Generation Partnership Project; Technical Specification Group Radio Access Network; NR; Physical layer procedures for control (Release 15), 101 pages.
3GPP TS 36.133 V15.3.0 (Jun. 2018), 3rd Generation Partnership Project; Technical Specification Group Radio Access Network; Evolved Universal Terrestrial Radio Access (E-UTRA); Requirements for support of radio resource management (Release 15), 3,128 pages.
Communication pursuant to Article 94(3) EPC dated Jun. 20, 2023, corresponding to European Patent Application No. 19783281.9.
International Search Report and Written Opinion dated Dec. 3, 2019 corresponding to International Patent Application No. PCT/EP2019/076802.
Intel: "CR to TS 38.133: Implementation of endorsed draft CRs from RAN4-AH-1807 and RAN4#88," 3GPP Draft; R4-1811913, 3GPP TSG-WG4 RAN#88, Gothenburg, Sweden, Sep. 6, 2018, XP051513292.
Sharp: "Remaining issues on beam failure recovery," 3GPP Draft; R2-1800560, 3GPP TSG-RAN WG2 NR Ad hoc 0118, Vancouver, Canada, Jan. 12, 2018, XP051386222.
RAN1: "LS to RAN2 on Beam Failure Recovery," 3GPP Draft; R2-1800003, 3GPP TSG RAN WG2#AH-1801, Vancouver, Canada, Jan. 8, 2018, XP051385540.
3GPP TS 38.133 V15.3.0 (Sep. 2018), Technical Specification, 3rd Generation Partnership Project; Technical Specification Group Radio Access Network; NR; Requirements for support of radio resource management (Release 15), Sep. 2018.
Japanese Office Action corresponding to JP Application No. 2021-518770, dated Oct. 31, 2022.
Office Action dated May 23, 2022, corresponding to Japanese Patent Application No. 2021-518770.
CMCC, Discussion on beam management, 3GPP TSG-RAN WG4 Meeting #88bis R4-1812560, Sep. 28, 2018.
OPPO, Discussion on Multi-beam Operation Enhancements, 3GPP TSG RAN WG1 #94bis R1-1811635, Oct. 1, 2018.
Huawei, HiSilicon, Correction on parallel SR transmission and RACH transmission, 3GPP TSG-RAN WG2 Meeting #102 R2-1807841, May 11, 2018.
Intel, CR to TS 38.133: Implementation of endorsed draft CRs from RAN4-AH-1807 and RAN4 #88, 3GPP TSG-WG4 RAN#88 R4-1811913, Sep. 5, 2018 (a document disclosing the well-known technique).
Indian Examination Report corresponding to IN Application No. 202147019903, dated Feb. 17, 2022.

* cited by examiner

PRIORITIZING BEAM RECOVERY MEASUREMENTS OVER OTHER MEASUREMENTS

CROSS REFERENCE TO RELATED APPLICATION

This application claims the benefit of U.S. Provisional Application No. 62/741,991, filed Oct. 5, 2018. The entire content of the above-referenced application is hereby incorporated by reference.

BACKGROUND

Field

Certain embodiments may relate to wireless communication systems. For example, some embodiments may relate to beam recovery procedures.

Description of the Related Art

In new radio implementations, minimum requirements of user equipment are used to define expected behavior, where network conditions may change more rapidly than anticipated. For example, if the network has configured the user equipment to perform certain measurements for mobility purposes, but the reported measurements are delayed or the connection is broken prior to transmitting the measurements, the network may not send a handover to the user equipment early enough. This may lead to user equipment not being handed off from the serving cell to a new cell, which may lead to a connection loss. Thus, it is desirable to provide fast beam recovery with decreased recovery latency.

SUMMARY

In accordance with some embodiments, a method may include determining, by a user equipment, that a number of beam failure instances is greater than or equal to at least one threshold. The method may further include initiating, by the user equipment, at least one measurement on at least one beam candidate set. The method may further include suspending, by the user equipment, at least one non-beam candidate measurement performed by the user equipment.

In accordance with some embodiments, an apparatus may include means for determining that a number of beam failure instances is greater than or equal to at least one threshold. The apparatus may further include means for initiating at least one measurement on at least one beam candidate set. The apparatus may further include means for suspending at least one non-beam candidate measurement performed by the apparatus.

In accordance with some embodiments, an apparatus may include at least one processor and at least one memory including computer program code. The at least one memory and the computer program code may be configured to, with the at least one processor, cause the apparatus to at least determine that a number of beam failure instances is greater than or equal to at least one threshold. The at least one memory and the computer program code may be further configured to, with the at least one processor, cause the apparatus to at least initiate at least one measurement on at least one beam candidate set. The at least one memory and the computer program code may be further configured to, with the at least one processor, cause the apparatus to at least suspend at least one non-beam candidate measurement performed by the apparatus.

In accordance with some embodiments, a non-transitory computer readable medium may comprise program instructions for causing an apparatus to perform a method. The method may determine that a number of beam failure instances is greater than or equal to at least one threshold. The method may further initiate at least one measurement on at least one beam candidate set. The method may further suspend at least one non-beam candidate measurement performed by the apparatus.

In accordance with some embodiments, a computer program product may perform a method. The method may determine that a number of beam failure instances is greater than or equal to at least one threshold. The method may further initiate at least one measurement on at least one beam candidate set. The method may further suspend at least one non-beam candidate measurement.

In accordance with some embodiments, an apparatus may include circuitry configured to determine that a number of beam failure instances is greater than or equal to at least one threshold. The circuitry may further initiate at least one measurement on at least one beam candidate set. The circuitry may further suspend at least one non-beam candidate measurement performed by the apparatus.

In accordance with some embodiments, a method may include evaluating, by a user equipment, whether at least one layer 1-reference signal received power measured on at least one configured resource in a set $\bar{q}_1$ estimated over a first period improves more than at least one threshold within a second period. At least one configured resource has not been measured or measured less than the second period for other purposes.

In accordance with some embodiments, an apparatus may include means for evaluating whether at least one layer 1-reference signal received power measured on at least one configured resource in a set $\bar{q}_1$ estimated over a first period improves more than at least one threshold within a second period. At least one configured resource has not been measured or measured less than the second period for other purposes.

In accordance with some embodiments, an apparatus may include at least one processor and at least one memory including computer program code. The at least one memory and the computer program code may be configured to, with the at least one processor, cause the apparatus to at least evaluate whether at least one layer 1-reference signal received power measured on at least one configured resource in a set $\bar{q}_1$ estimated over a first period improves more than at least one threshold within a second period. At least one configured resource has not been measured or measured less than the second period for other purposes.

In accordance with some embodiments, a non-transitory computer readable medium may be encoded with instructions that may, when executed in hardware, perform a method. The method may evaluate whether at least one layer 1-reference signal received power measured on at least one configured resource in a set $\bar{q}_1$ estimated over a first period improves more than at least one threshold within a second period. At least one configured resource has not been measured or measured less than the second period for other purposes.

In accordance with some embodiments, a computer program product may perform a method. The method may evaluate whether at least one layer 1-reference signal received power measured on at least one configured resource in a set $\bar{q}_1$ estimated over a first period improves more than at least one threshold within a second period. At least one configured resource has not been measured or measured less than the second period for other purposes.

In accordance with some embodiments, an apparatus may include circuitry configured to evaluate whether at least one layer 1-reference signal received power measured on at least one configured resource in a set $\bar{q}_1$ estimated over a first period improves more than at least one threshold within a second period. At least one configured resource has not been measured or measured less than the second period for other purposes.

BRIEF DESCRIPTION OF THE DRAWINGS

For proper understanding of this disclosure, reference should be made to the accompanying drawings, wherein.

DETAILED DESCRIPTION

Certain embodiments described herein may help to manage beam failure recovery procedures. The example embodiments described herein may have various benefits and/or advantages. For example, some embodiments may improve the speed of beam recovery procedures by prioritizing beam failure recovery measurements over other measurement procedures. Certain embodiments are, therefore, directed to improvements in computer-related technology, specifically, by conserving network resources and reducing power consumption of network entities and/or user equipment located within the network.

Beam failure detection (BFD) and radio link monitoring (RLM) procedures operate differently but in parallel, where BFD functions on layer 1 (L1) and/or medium access control (MAC) layers. User equipment (UE) may be configured with a set of BFD reference signals, such as $q_0$, which may be used to estimate beam quality. When the UE detects poor channel conditions on reference signals in the set $q_0$, the L1 layer may transmit a beam failure indication to the MAC layer. The MAC layer may comprise a beam failure indication counter, which may begin at 0, and if enough beam failure instance indications are received from lower layers, the MAC entity may start a timer, such as beamFailureDetectionTimer, and increment a counter, such as BFI_COUNTER, by one for each beam failure indication. When the counter, such as BFI_COUNTER, reaches a predefined maximum value, such as beamFailureInstanceMaxCount, the UE may determine that a beam failure has occurred, and initiate beam failure recovery procedures to start beam failure recovery.

The active uplink (UL) bandwidth part (BWP) may be configured with BeamFailureRecoveryConfig, which may be used to configure the UE with random access channel (RACH) resources and candidate beams for BFR. In the case of beam failure, the UE shall perform layer 1 (L1)-reference signal received power (RSRP) measurements based on the reference signal indicated in candidateBeamRSList, which may be a list of reference signals (CSI-RS and/or SSB) identifying the candidate beams for recovery.

Figure 1:
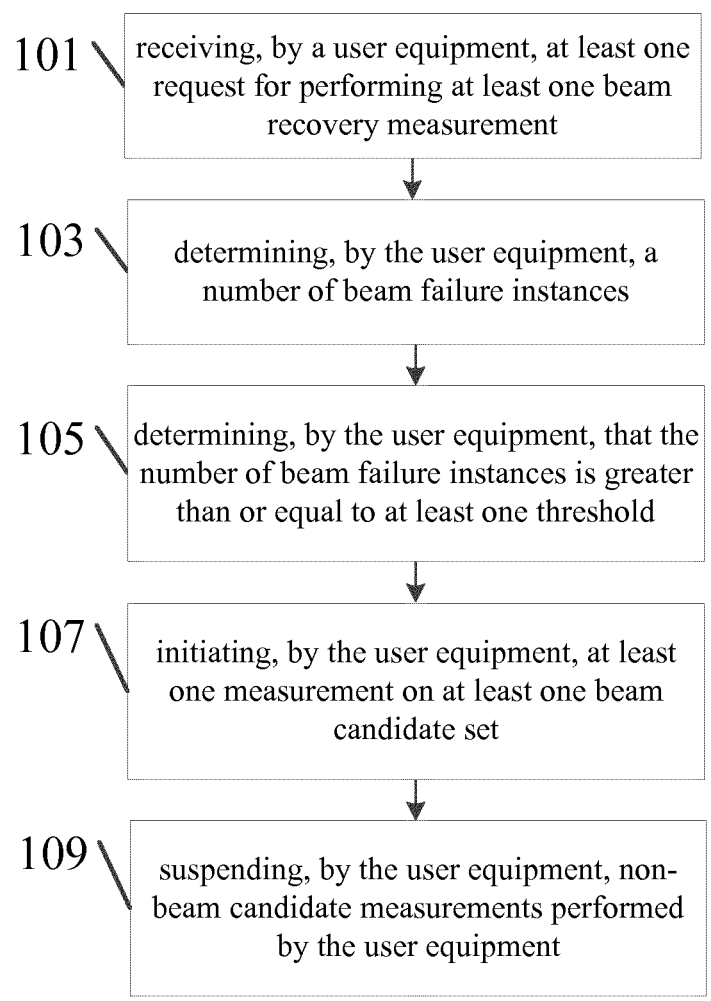
FIG. 1 illustrates an example of a method performed by a user equipment according to certain embodiments.
Figure 2:
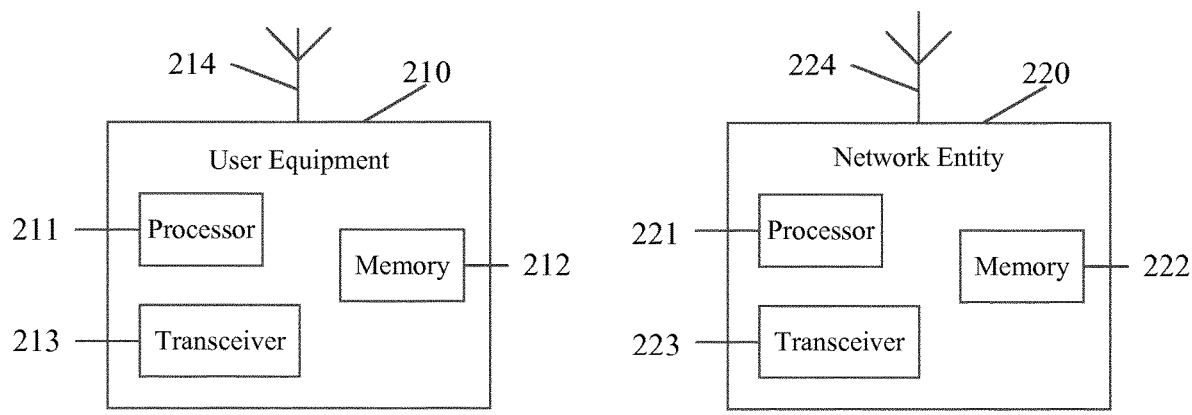
FIG. 2 illustrates an example of a system according to certain embodiments.

FIG. 1 illustrates an example of a method performed by a user equipment, for example, user equipment 210 in FIG. 2. In step 101, the user equipment may receive at least one request associated with performing at least one beam recovery measurement. In step 103, the user equipment may determine a number of beam failure instances, such as BFI_COUNTER. For example, the determination may be performed for at least one resource in the set $\bar{q}_1$ configured for a serving cell, provided that the at least one resource configured for candidate beam detection is actually transmitted within UE active downlink (DL) BWP during the entire evaluation period.

In some embodiments, the at least one resource in the set $\bar{q}_1$ configured for the serving cell may be associated with SS-based candidate beams. For example, the UE may determine whether at least one L1-RSRP measured on the configured SSB resource in the set $\bar{q}_1$ estimated over the last $T_{Evaluate\_CBD\_SSB}$ period improves by a threshold amount $Q_{in\_LR}$ within $T_{Evaluate\_CBD\_SSB}$ period, which may be defined in milliseconds. For a frequency of 450-6000 MHz and type sub-6 GHz (FR1), the value of $T_{Evaluate\_CBD\_SSB}$ period may be defined as:

| Configuration | $T_{Evaluate\_CBD\_SSB}$ (ms) for FR1 |
|---|---|
| non-DRX | max(TBD, ceil([TBD])*$T_{SSB}$) |
| DRX cycle ≤ 320 ms | max(TBD, ceil([TBD]*1.5)*max($T_{DRX}$,$T_{SSB}$) ) |
| DRX cycle > 320 ms | ceil([TBD])*$T_{DRX}$ |

Note:
$T_{SSB}$ is the periodicity of SSB in the set $\bar{q}_1$. $T_{DRX}$ is the DRX cycle length.

Alternatively, for a frequency of 24250-52600 MHz and type mm-Wave (FR2), the value of $T_{Evaluate\_CBD\_out}$ period may be defined as:

| Configuration | $T_{Evaluate\_CBD\_out}$ (ms) for FR2 |
|---|---|
| non-DRX | max(TBD, ceil([TBD]*N) * $T_{SSB}$ |
| DRX cycle ≤ 320 ms | max(TBD, ceil([TBD]*N*1.5)*max($T_{DRX}$,$T_{SSB}$)) |
| DRX cycle > 320 ms | ceil([TBD]*N) * $T_{DRX}$ |

Note:
$T_{SSB}$ is the periodicity of SSB in the set $\bar{q}_1$. $T_{DRX}$ is the DRX cycle length.

In some embodiments, the at least one resource in the set $\bar{q}_1$ configured for the serving cell may be associated with at least one CSI-RS candidate beam. For example, the UE may determine whether at least one L1-RSRP measured on the configured CSI-RS resource in the set $\bar{q}_1$ estimated over the last $T_{Evaluate\_CBD\_CSI-RS}$ period improves by a threshold amount $Q_{in\_LR}$ within $T_{Evaluate\_CBD\_CSI-RS}$ period, which may be defined in milliseconds. For a frequency of 450-6000 MHz and type sub-6 GHz (FR1), the value of $T_{Evaluate\_CBD\_CSI-RS}$ period may be defined as:

| Configuration | $T_{Evaluate\_CBD\_CSI-RS}$ (ms) for FR1 |
|---|---|
| non-DRX | max(TBD, ceil($M_{CBD}$)*$T_{CSI-RS}$) |
| DRX cycle ≤ 320 ms | max(TBD, ceil($M_{CBD}$ *N)*max($T_{DRX}$, $T_{CSI-RS}$)) |
| DRX cycle > 320 ms | ceil($M_{CBD}$)*$T_{DRX}$ |

Note:
$T_{CSI-RS}$ is the periodicity of CSI-RS resource in the set $\bar{q}_1$. $T_{DRX}$ is the DRX cycle length.

Alternatively, for a frequency of 24250-52600 MHz and type mm-Wave (FR2), the value of $T_{Evaluate\_CSI-RS\_out}$ period may be defined as:

| Configuration | $T_{Evaluate\_CBD\_CSI-RS}$ (ms) for FR2 |
|---|---|
| non-DRX | max(TBD, ceil($M_{CBD}$*N) * $T_{CSI-RS}$) |
| DRX cycle ≤ 320 ms | max(TBD, ceil($M_{CBD}$*N*1.5) * max($T_{DRX}$, $T_{CSI-RS}$)) |
| DRX cycle > 320 ms | ceil($M_{CBD}$ *N) *$T_{DRX}$ |

Note:
$T_{CSI-RS}$ is the periodicity of CSI-RS resource in the set $\bar{q}_1$. $T_{DRX}$ is the DRX cycle length.

$M_{CBD}$ may be a value dependent on whether the CSI-RS resource configured in the set $\bar{q}_1$ is transmitted with a threshold density, such as 3.

In step 105, the user equipment may determine that the number of beam failure instances is greater than or equal to at least one threshold, such as beamFailureInstanceMax-Count. In step 107, the user equipment may initiate at least one measurement on at least one beam candidate set. In step 109, the user equipment may suspend non-beam candidate measurements, including radio resource measurements, performed by the user equipment. In some embodiments, the suspension may be for all non-beam candidate measurements performed by the user equipment and/or may prevent non-beam candidate measurements from being initiated until the at least one measurement on at least one beam candidate set is complete. Additionally or alternatively, at least one SSB-based candidate beam measurement may be performed without regard to measurement gap configuration.

In some embodiments, the latency time between beam failure detection and beam recovery may be reduced. Upon a UE detecting an initial beam failure and sending an indication of the failure to a MAC, the UE may initiate measurements of a threshold number of potential beam candidates in the candidate set $q_1$. The measurements may be performed before any MAC request of beam candidate measurements, such as L1-RSRP, for beam candidate selection.

In some embodiments, the UE may initiate at least one measurement upon the first indication of beam failure to a MAC layer. Additionally or alternatively, the measurements may be initiated based on the beam failure counter on a MAC layer, such as BFI_COUNTER, where BFI_COUNTER/2 indications may be transmitted to the MAC layer. Additionally or alternatively, the MAC layer may trigger beam failure recovery measurements upon the detection, and/or may initiate a beam recovery process only after BFI_COUNTER reaches a maximum value. Additionally or alternatively, the MAC layer may deliver the BFI_COUNTER to L1, which may then initiate associated measurements.

In some embodiments, at least one UE measurement latency for beam candidates in $q_1$ depends on whether one or more of the beam candidates are part of existing measurement, such as RRM, for example, SSB-based RRM measurements. If at least one beam candidate in set $q_1$ in an SSB which has been measured for RRM purposes, the UE may deliver the requested candidate results to the network without delay once requested, with no additional delay or measurement efforts being needed by the UE.

It would be beneficial to define when a UE initiates candidate beam detection measurements, which may reduce the latency time between beam failure detecting and beam recovery. For example, a UE may be permitted a given time, $T_{Evaluate\_CBD\_SSB}$, for measuring the beam candidates. However, for SSB based beam candidates, the RS (SSB) may already have been measured for RRM measurements purposes since the UE is continuously performing intra-frequency measurements, and therefore the UE would, in fact, not need any additional measurement time, $T_{Evaluate\_CBD\_SSB}$. Furthermore, there should be no additional measurement delay, but instead, the UE may deliver the results promptly once requested by higher layers.

In certain embodiments, the measurement time for beam candidate detection, $T_{Evaluate\_CBD\_SSB}$, may be made conditional. For example, the condition may be that the UE may allow the additional measurement time, $T_{Evaluate\_CBD\_SSB}$, only for candidates not yet measured by the UE. Otherwise, the UE may not be configured to allow any additional measurement time.

In some embodiments, the UE may evaluate whether the L1-RSRP measured on a configured SSB resource in set $\bar{q}_1$ estimated over the last $T_{Evaluate\_CBD\_SSB}$ [ms] period improves by a threshold amount $Q_{in\_LR}$ within $T_{Evaluate\_CBD\_SSB}$ [ms] period for configured SSB resources, which have not been measured already or measured less than $T_{Evaluate\_CBD\_SSB}$ [ms] for other purposes. For SSB resources which have already been measured for other purposes for at least $T_{Evaluate\_CBD\_SSB}$ [ms], the $T_{Evaluate\_CBD\_SSB}$ [ms]=0 ms.

In some embodiments, the value of $T_{Evaluate\_CBD\_SSB}$ for FR1 may be defined as:

| Configuration | $T_{Evaluate\_CBD\_SSB}$ (ms) |
|---|---|
| non-DRX | max(TBD, ceil([TBD]*P) * $T_{SSB}$) |
| DRX cycle ≤ 320 ms | max(TBD, ceil([TBD]*P*1.5)* max($T_{DRX}$,$T_{SSB}$) ) |
| DRX cycle > 320 ms | ceil([TBD]*P) * $T_{DRX}$ |

Note:
$T_{SSB}$ is the periodicity of SSB in the set $\bar{q}_1$. $T_{DRX}$ is the DRX cycle length.

And in various embodiments, the value of $T_{Evaluate\_CBD\_SSB}$ for FR1 with N=FFS may be defined as:

| Configuration | $T_{Evaluate\_CBD\_SSB}$ (ms) |
|---|---|
| non-DRX | max(TBD, ceil([TBD]*P) * $T_{SSB}$) |
| DRX cycle ≤ 320 ms | max(TBD, ceil([TBD]*P*1.5)* max($T_{DRX}$,$T_{SSB}$) ) |
| DRX cycle > 320 ms | ceil([TBD]*P) * $T_{DRX}$ |

Note:
$T_{SSB}$ is the periodicity of SSB in the set $\bar{q}_1$. $T_{DRX}$ is the DRX cycle length.

In certain embodiments, P=1/(1−$T_{SSB}$/MGRP) when, in the monitored cell, there are measurement gaps configured for intra-frequency, inter-frequency and/or inter-RAT measurements, which may overlap with some, but not all, occasions of the SSB. Alternatively or additionally, P=1 when, in the monitored cell, there are no measurement gaps overlapping with any occasion of the SSB.

FIG. 2 illustrates an example of a system according to certain embodiments. In one embodiment, a system may include multiple devices, such as, for example, user equipment 210 and network entity 220. UE 210 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 220 may be one or more of a base station, such as an evolved node B (eNB) or next generation node B (gNB), a next generation radio access network (NG RAN), a serving gateway, a server, and/or any other access node or combination thereof.

One or more of these devices may include at least one processor, respectively indicated as 211 and 221. At least one memory may be provided in one or more of devices indicated at 212 and 222. The memory may be fixed or removable. The memory may include computer program instructions or computer code contained therein. Processors 211 and 221 and memory 212 and 222 or a subset thereof, may be configured to provide means corresponding to the various blocks of FIG. 1. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceivers 213 and 223 may be provided, and one or more devices may also include at least one antenna, respectively illustrated as 214 and 224. The device may have many antennas, such as an array of antennas configured for multiple input multiple output (MIMO) communications, or multiple antennas for multiple radio access technologies. Other configurations of these devices, for example, may be provided.

Transceivers 213 and 223 may be a transmitter, a receiver, or both a transmitter and a receiver, or a unit or device that may be configured both for transmission and reception.

Processors 211 and 221 may be embodied by any computational or data processing device, such as a central processing unit (CPU), application specific integrated circuit (ASIC), or comparable device. The processors may be implemented as a single controller, or a plurality of controllers or processors.

Memory 212 and 222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIG. 1). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIG. 1. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
4G 4th Generation Mobile Network
5G 5th Generation Mobile Network
BF Beam Failure
BFD Beam Failure Detection
BFR Beam Failure Recovery
BLER Block Error Rate
BWP Bandwidth Part
CSI-RSRP Channel State Information Reference Signal Received Power
DL Downlink
FR1 Frequency Range 1
FR2 Frequency Range 2
MAC Medium Access Control
MGRP Measurement Gap Repetition Period
NE Network Entity
NG-RAN NG Radio Access Network
RAN Radio Access Network
RLF Radio Link Failure
RLM Radio Link Monitoring
RRM Radio Resource Management
RS Reference Signal
RSRP Reference Signal Received Power SS Synchronization Signal
SSB Synchronization Signal Block
PBCH Physical Broadcast Channel
UE User Equipment
UL Uplink

We claim:

1. A method, comprising:
determining, by a user equipment, that a number of beam failure instances is greater than or equal to at least one threshold;
initiating, by the user equipment, at least one measurement on at least one beam candidate set; and
suspending, by the user equipment, at least one non-beam candidate measurement, wherein the suspending suspends all non-beam candidate measurements performed by the apparatus or prevents at least one non-beam candidate measurement from being initiated until the at least one measurement on at least one beam candidate set is complete.

2. The method according to claim 1, further comprising: receiving, by the user equipment, at least one request for performing at least one beam recovery measurement.

3. The method according to claim 1, further comprising: determining, by the user equipment, a number of beam failure instances.

4. The method according to claim 1, wherein the determination is performed for at least one resource in set $q_1$ configured for a serving cell, wherein the at least one resource configured for candidate beam detection is actually transmitted within a user equipment active downlink bandwidth part during the entire evaluation period.

5. The method according to claim 1, wherein the at least one resource in the set $q_1$ configured for the serving cell is associated with at least one synchronization signal-based candidate beam.

6. The method according to claim 1, further comprising: determining, by the user equipment, whether at least one layer 1-reference signal received power measured on the configured synchronization signal block resource in the set $q_1$ estimated over period $T_{Evaluate\_CBD\_SSB}$ improves by a threshold amount $Q_{in\_LR}$ within period $T_{Evaluate\_CBD\_SSB}$.

7. The method according to claim 1, wherein the at least one resource in the set $q_1$ configured for the serving cell is associated with at least one channel state information reference signal candidate beam.

8. An apparatus, comprising:
at least one processor; and
at least one memory including computer program code, wherein the at least one memory and the computer program code are configured to, with the at least one processor, cause the apparatus to:
determine that a number of beam failure instances is greater than or equal to at least one threshold;
initiate at least one measurement on at least one beam candidate set; and
suspend at least one non-beam candidate measurement performed by the apparatus wherein the suspending suspends all non-beam candidate measurements performed by the apparatus or prevents at least one non-beam candidate measurement from being initiated until the at least one measurement on at least one beam candidate set is complete.

9. The apparatus according to claim 8, wherein the at least one memory and the computer program code are further configured to, with the at least one processor, cause the apparatus to:
receive at least one request for performing at least one beam recovery measurement.

10. The apparatus according to claim 8, wherein the at least one memory and the computer program code are further configured to, with the at least one processor, cause the apparatus to:
determine a number of beam failure instances.

11. The apparatus according to claim 8, wherein the at least one resource in the set $q_1$ configured for the serving cell is associated with at least one synchronization signal-based candidate beam.

12. The apparatus according to claim 8, wherein the at least one memory and the computer program code are further configured to, with the at least one processor, cause the apparatus to:
determine whether at least one layer 1-reference signal received power measured on the configured synchronization signal block resource in the set $q_1$ estimated over period $T_{Evaluate\_CBD\_SSB}$ improves by a threshold amount $Q_{in\_LR}$ within period $T_{Evaluate\_CBD\_SSB}$.

13. The apparatus according to claim 8, wherein the at least one resource in the set $q_1$ configured for the serving cell is associated with at least one channel state information reference signal candidate beam.

14. A non-transitory computer-readable medium comprising computer-executable instructions that, when executed by a processor, cause the processor to perform the following operations:
determining that a number of beam failure instances is greater than or equal to at least one threshold;
initiating at least one measurement on at least one beam candidate set; and
suspending at least one non-beam candidate measurement, wherein the suspending suspends all non-beam candidate measurements performed by the apparatus or prevents at least one non-beam candidate measurement from being initiated until the at least one measurement on at least one beam candidate set is complete.

15. The non-transitory computer-readable medium of claim 14, wherein the computer-executable instructions further cause the processor to perform the following operations:
receiving at least one request for performing at least one beam recovery measurement.

16. The non-transitory computer-readable medium of claim 14, wherein the computer-executable instructions further cause the processor to perform the following operations:
determining a number of beam failure instances.

17. The non-transitory computer-readable medium of claim 14, wherein the determination is performed for at least one resource in set $q_1$ configured for a serving cell, wherein the at least one resource configured for candidate beam detection is actually transmitted within a user equipment active downlink bandwidth part during the entire evaluation period.

18. The non-transitory computer-readable medium of claim 14, wherein the at least one resource in the set $q_1$ configured for the serving cell is associated with at least one synchronization signal-based candidate beam.

19. The non-transitory computer-readable medium of claim 14, wherein the computer-executable instructions further cause the processor to perform the following operations:
determining whether at least one layer 1-reference signal received power measured on the configured synchronization signal block resource in the set $q_1$ estimated over period $T_{Evaluate\_CBD\_SSB}$ improves by a threshold amount $Q_{in\_LR}$ within period $T_{Evaluate\_CBD\_SSB}$.

20. The non-transitory computer-readable medium of claim 14, wherein the at least one resource in the set $q_1$ configured for the serving cell is associated with at least one channel state information reference signal candidate beam.

* * * * *